(12) United States Patent
Story, Jr. et al.

(10) Patent No.: US 9,420,319 B1
(45) Date of Patent: Aug. 16, 2016

(54) RECOMMENDATION AND PURCHASE OPTIONS FOR RECOMMEMDED PRODUCTS BASED ON ASSOCIATIONS BETWEEN A USER AND CONSUMED DIGITAL CONTENT

(71) Applicant: Audible, Inc., Newark, NJ (US)

(72) Inventors: Guy Ashley Story, Jr., New York, NY (US); Ajay Arora, New York, NY (US); Douglas Scott Goldstein, Riverdale, NY (US); Douglas Cho Hwang, New York, NY (US); Shirley C. Yang, New York, NY (US)

(73) Assignee: AUDIBLE, INC., Newark, NJ (US)

(*) Notice: Subject to any disclaimer, the term of this patent is extended or adjusted under 35 U.S.C. 154(b) by 440 days.

(21) Appl. No.: 13/692,836

(22) Filed: Dec. 3, 2012

Related U.S. Application Data

(60) Provisional application No. 61/632,841, filed on Jun. 7, 2012.

(51) Int. Cl.
| | |
|---|---|
| *H04N 5/445* | (2011.01) |
| *G06Q 30/00* | (2012.01) |
| *H04N 21/25* | (2011.01) |
| *G06Q 30/06* | (2012.01) |
| *H04N 21/4722* | (2011.01) |
| *G06Q 30/02* | (2012.01) |
| *H04N 21/4223* | (2011.01) |
| *G06F 3/00* | (2006.01) |

(52) U.S. Cl.
CPC .......... *H04N 21/251* (2013.01); *G06Q 30/0269* (2013.01); *G06Q 30/0631* (2013.01); *H04N 21/4223* (2013.01); *H04N 21/4722* (2013.01)

(58) Field of Classification Search
CPC .......... H04N 21/4223; H04N 21/4722; H04N 21/251; G06Q 30/0631; G06Q 30/0269
USPC .......... 725/39, 46, 60; 348/563, 569; 705/14.25, 14.49, 14.53, 14.66, 14.67
See application file for complete search history.

(56) References Cited

U.S. PATENT DOCUMENTS

| | | | | |
|---|---|---|---|---|
| 8,285,776 | B2 * | 10/2012 | Svendsen .......... | G06F 17/30038 709/202 |
| 8,707,363 | B2 * | 4/2014 | Phillips ............ | H04N 21/44204 725/46 |
| 2003/0110507 | A1 * | 6/2003 | Dimitrova .............. | G06Q 30/02 725/110 |
| 2008/0134236 | A1 * | 6/2008 | Iijima .................... | H04H 20/28 725/34 |
| 2010/0333137 | A1 * | 12/2010 | Hamano et al. ................. | 725/39 |
| 2011/0239253 | A1 * | 9/2011 | West et al. ....................... | 725/46 |
| 2012/0227073 | A1 * | 9/2012 | Hosein et al. ................... | 725/60 |

(Continued)

*Primary Examiner* — Hoang-Vu A Nguyen-Ba
(74) *Attorney, Agent, or Firm* — Knobbe, Martens, Olson & Bear, LLP

(57) ABSTRACT

Features are disclosed for providing notifications or recommendations to users based on user profile information and digital content the user is watching. In some implementations, a user can be watching a television program on a network enabled television. The systems and methods may determine characteristics of the television program and obtain user profile information. The systems and methods then may analyze the determined characteristics and user profile information to determine an association between the user and an item of interest in the television program. The systems and methods then may generate and provide a notification relating to the association to the user. Optionally, the systems and methods may also provide one or more recommendations to the user based at least in part on the determined association.

30 Claims, 10 Drawing Sheets

(56) References Cited

U.S. PATENT DOCUMENTS

| | | | |
|---|---|---|---|
| 2012/0233183 A1* | 9/2012 | Nakahashi | G06Q 30/02 707/749 |
| 2013/0007787 A1* | 1/2013 | John et al. | 725/10 |
| 2013/0152128 A1* | 6/2013 | Tanna et al. | 725/39 |
| 2014/0009680 A1* | 1/2014 | Moon | H04N 21/4316 348/563 |
| 2014/0150029 A1* | 5/2014 | Avedissian | G06Q 30/0261 725/60 |

* cited by examiner

RECOMMENDATION AND PURCHASE OPTIONS FOR RECOMMEMDED PRODUCTS BASED ON ASSOCIATIONS BETWEEN A USER AND CONSUMED DIGITAL CONTENT

CROSS REFERENCE TO RELATED APPLICATIONS

This application is claims the benefit of U.S. Provisional Application No. 61/632,841, entitled SYSTEMS AND METHODS FOR PROVIDING AN ASSOCIATION BETWEEN A USER AND A VIDEO PROGRAM, and filed on Jun. 7, 2012, the entirety of which is incorporated herein by reference.

BACKGROUND

A computer-implemented recommendation may recommend items of interest to a user browsing an electronic network resource, such as a retail web site or a library web site. The recommendations generated by such a computer-implemented service may be customized to a particular user based on information known about the user. One common application for a recommendation service involves recommending goods and services ("items") for potential purchase to users shopping on a retail website. For example, the recommendation service may recommend items (e.g., books, compact discs, videos, apparel, accessories, personal electronic devices, etc.) to a user based on a profile that has been developed for the user. For instance, the profile may include information regarding the user's purchase history, rental history, product viewing history, item tagging activities, wish lists and/or other historical or behavioral aspects. Recommendation services are also commonly used for recommending web sites, articles, music and video files, television shows, restaurants and other types of items to users.

While advertising and recommending products and services via web sites and other network resources is a relatively recent technological advance, commercial television has long been used to advertise items. However, targeting strategies for advertising on commercial television have traditionally not been based on personalized or individual recommendations.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
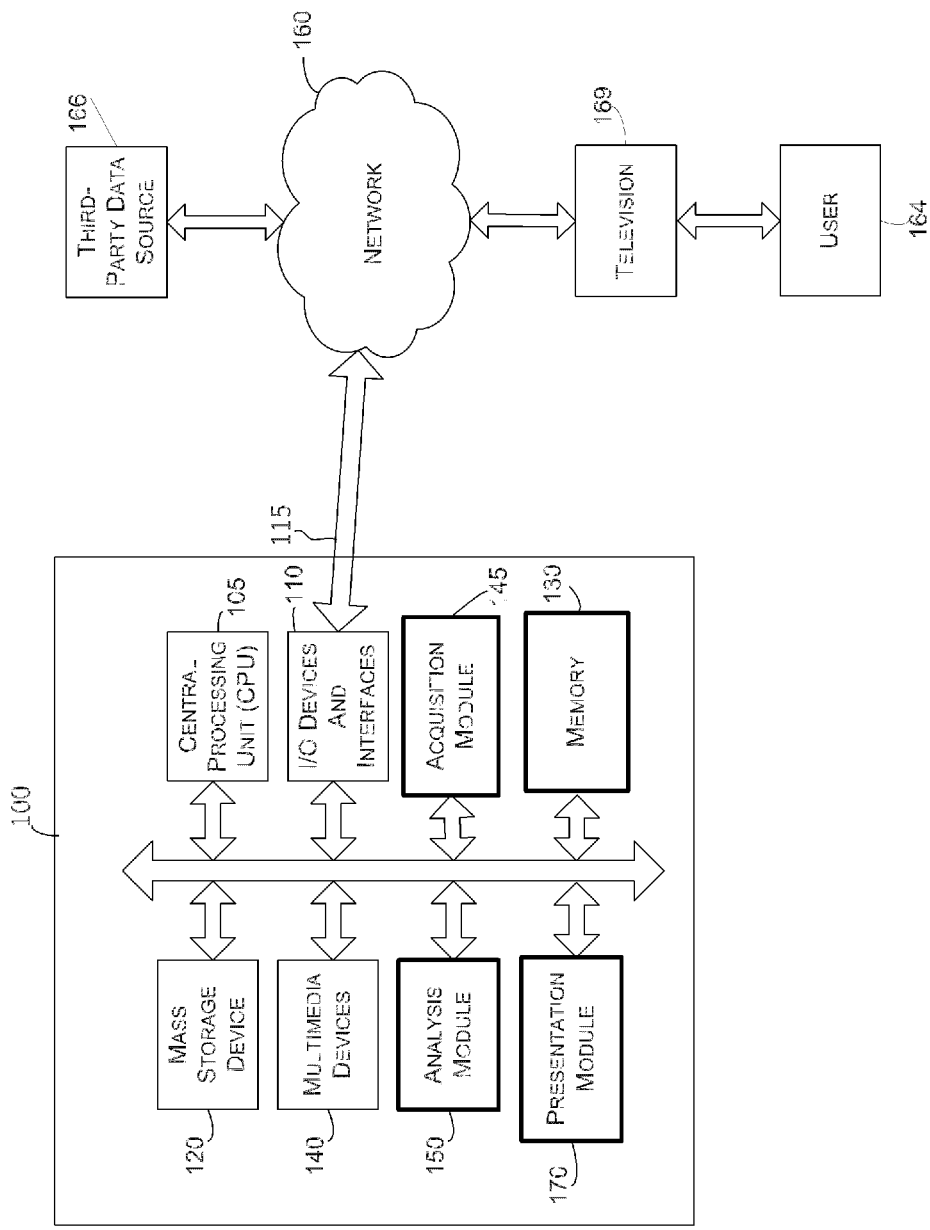
FIG. 1A depicts an illustrative embodiment of a networked environment in which a recommendation service that generates one or more recommendations for items of possible interest to a user, which recommendations are based at least in part on an association between the user and digital content being consumed by the user.

Generally described, the present disclosure relates to providing a recommendation to a user based at least in part on an association between a user and digital content consumed by the user via a network enabled television or other computing device capable of displaying downloaded or streamed digital content. More specifically, an association between the user and an item depicted in, mentioned in, displayed in, or otherwise associated with, the digital content that the user is consuming, may be determined by analyzing the user's profile and/or the digital content. The recommendation service may then generate a recommendation for the user of another item(s) in which the user may be interested, which recommendation may be based at least in part on the determined association. Subsequently, the recommendation service may provide a notification to the user informing him/her of the determined association and/or providing the recommendation of the other item(s) of interest.

For example, the user may be watching a television program on a network enabled television. The user may request initiation of the recommendation service by launching an application on the network enabled television while the user is watching the television program. The request can include information such as time, day, location of the user at the time of the request, identification of the digital content being consumed at the time of the request, identification of user(s) watching the digital content at the time of the request, etc.

Once initiated, the recommendation service may determine one or more characteristics of the digital content being consumed by the user, as well as profile information related to the user, and use this information to make an association and generate a recommendation for the user. For example, the recommendation service may determine a location of the user using GPS data acquired from the network enabled television or another device associated with the user, such as the user's mobile phone. The recommendation service may then identify one or more characteristics of the digital content from third party data sources of such information. In some embodiments, the digital content may include metadata, and the recommendation service may identify characteristics of the digital content by analyzing the metadata. For example, while the user is watching a television program, the recommendation service may identify one or more characteristics of the television program by analyzing metadata that is broadcast with the television program. Characteristics information may include, but are not limited to, a program title, a plot summary, the names of characters, the names of actors playing the characters, the names of shooting locations, the program date, items displayed or referenced in the program, locations depicted or referenced in the program, etc.

Once such characteristic(s) is identified, and as the user watches the television program, the recommendation service may analyze the user's profile information and the characteristic(s) of the television program, and determine an association between the user and the program. For example, the recommendation service may determine based at least in part on the characteristic(s) of the program and the user's profile information that an actor in the television program is wearing a pair of shoes already owned by the user. The recommendation service may then generate a recommendation for a belt based on the association made between the user owning shoes being worn by an actor in the television program. Once the recommendation is generated, the recommendation service may provide a notification to the user that includes information regarding the association between the user and the television program, and/or the recommendation for the belt. In the current example, the notification is displayed to the user on the network enabled television while the user is watching the television program. The notification may include details about the shoes worn by the character and owned by the user, as well as recommendation information regarding the belt. The recommendation information for the belt may include an image of the belt, a description of the belt, price of the belt, etc. as well as a link or other actionable reference to a web site or other network resource from which the user may purchase or otherwise obtain the belt.

Various aspects of the disclosure will now be described with regard to certain examples and embodiments, which are intended to illustrate but not to limit the disclosure.

FIG. 1A depicts an illustrative embodiment of a networked environment in which a recommendation service is implemented. The recommendation service may generate one or more recommendations for items of possible interest to a user 164, which recommendations are based at least in part on an association between the user 164 and digital content viewed by the user. The recommendation service may also provide one or more notifications of said recommendations to the user 164. In the embodiment of FIG. 1A, the user 164 is a person consuming digital content on a network enabled television 169 (or other network enabled digital content consumption device such as a digital video recording system ("DVR") or digital media receiver) and a computing device 100, such as a remote server, implements the recommendation service. As illustrated in FIG. 1A, the computing device 100 communicates with a third party data source 166 and the network enabled television 169 via a network 160. The network enabled television 169 may comprise one or more computing devices, software, firmware and hardware resources to enable the network enabled television 169 to connect to network 160 and download or stream digital content (e.g., a television program, a video program, a movie, a multimedia program, an audio program, an audio book, a song, an album, a video game, etc.) for presentation to the user 164.

Third party data sources 166 may comprise any remote or local computing devices or other computing resources from which the recommendation service may obtain profile information for the user 164. For example, a third party data source 166 may be a retail website, a social networking website, a yellow pages website, a demographic database, etc. In some embodiments, third party data sources 166 may also be any remote or local computing devices or other computing resources from which the recommendation service may obtain characteristics information for digital content being viewed by the user 164. For example, a third party data source 166 may comprise a retail website, a movie rental website, a blog website, a content information website, an entertainment website, a news website, etc. In addition, a third party data source 166 be any remote or local computing devices or other computing resources from which the digital content consumed by the user 164 is downloaded or streamed, such as a move rental web site, content delivery web site, video sharing web site, etc.

The network 160 may be any wired network, wireless network, or combination thereof. In addition, the network 160 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

In the embodiment illustrated in FIG. 1A, the computing device 100, which implements the recommendation service, may correspond to a logical association of one or more computing devices, such as an application server for generating recommendations, and a database server for storing profile information for users, digital content information, similarities data (as will be described below), and the like. In some embodiments, the features and services provided by the recommendations service may be implemented as one or more web services consumable via the network 160. In further embodiments, the recommendation service is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In the embodiment illustrated in FIG. 1A, the computing device 100 implementing the recommendation service includes one or more microprocessors/central processing units ("CPUs") 105. The CPUs 105 may execute a variety of operating systems that perform standard operating system functions such as, for example, opening, reading, writing and closing a file. The operating system may control and schedule computer processes for execution, perform memory management, provide file system, networking, I/O services and provide a user interface, such as a graphical user interface ("GUI"), among other things.

The computing device 100 may further include one or more memories 130, such as random access memory ("RAM") for temporary storage of information, read only memory ("ROM") for permanent storage of information, a mass storage device 120, such as a hard drive, diskette or optical media storage device, and/or other non-transitory, tangible computer readable media. The memory 130 may store software code or instructions for execution by the CPU 105 in order to cause the computing device 100 to perform certain operations, such as accessing user profile information, generating recommendations and providing notifications to users.

The operations and methods described and claimed herein may be performed by any suitable computing device(s), such as the computing device 100. The operations and methods may be executed on such suitable computing device(s) in response to execution of software instructions or other executable code read from a non-transitory, tangible computer readable medium or computer storage device. A computer readable medium is a data storage device that can store data that is readable by a computer system. Non-limiting examples of computer readable media include read-only memory, random-access memory, other volatile or non-volatile memory devices, CD-ROMs, magnetic tape, flash drives and optical data storage devices.

The example computing device 100 may include one or more input/output (I/O) devices and interfaces 110, such as a keyboard, trackball, mouse, drawing tablet, joystick, game controller, touchscreen (e.g., capacitive or resistive touchscreen), touchpad, accelerometer, network television interface, image capture device (e.g., a video camera) and/or printer, for example. The computing device 100 may also include one or more multimedia devices 140, such as a display device (also referred to herein as a display screen), which may also be one of the I/O devices 110 in the case of a touchscreen, for example. The computing device 100 may also include one or more multimedia devices, such as speakers, video cards, graphics accelerators and microphones, for example.

In the embodiment of FIG. 1A, the I/O devices and interfaces 110 provide a communication interface 115 to various external devices via the network 160. For example, the computing device 100 may be electronically coupled to the network 160 via a wired, wireless or combination of wired and wireless, communication link(s). The network 160 may allow communication with various other computing devices and/or other electronic devices via wired and/or wireless communication links.

In the embodiment of FIG. 1A, the computing device 100 also includes an acquisition module 145, an analysis module 150, and a presentation module 170. Each of these modules is discussed in further detail below. In general, the word "module," as used herein, refers to logic embodied in hardware and/or firmware, and/or to a collection of software instructions, possibly having entry and exit points, written in any programming language, such as, for example, the JAVA programming language, the PYTHON programming language, the PERL programming language, the LAU programming language, the C programming language, the C++ programming language, the C# programming language, etc. A software module may be compiled and linked into an executable program, installed in a dynamic link library, or may be written in an interpreted programming language such as, for example, the BASIC programming language, the PERL programming language, or the PYTHON programming language. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 100, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Figure 1B:
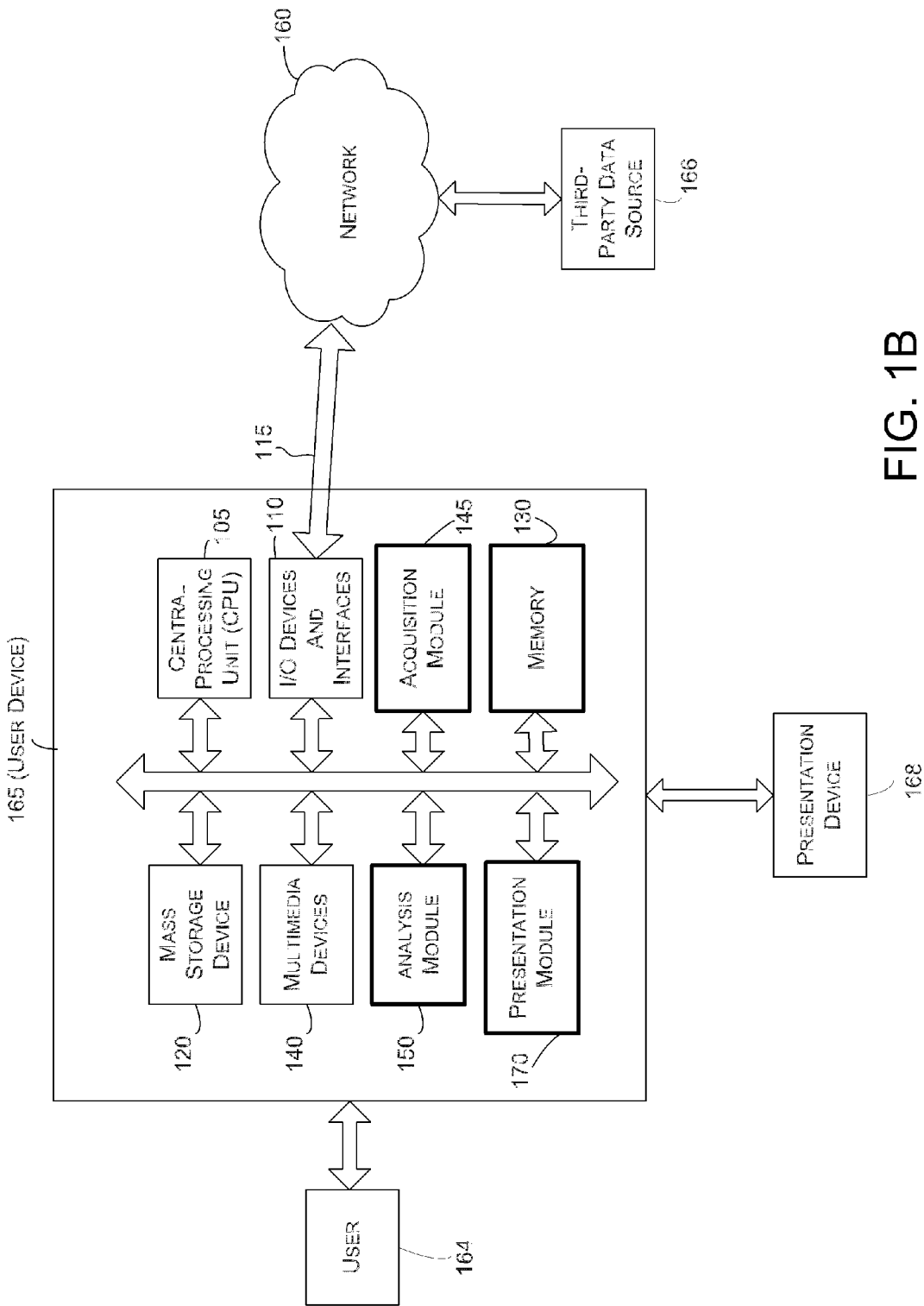
FIG. 1B depicts another illustrative embodiment of a networked environment in which a recommendation service that generates one or more recommendations for items of possible interest to a user, which recommendations are based at least in part on an association between the user and digital content being consumed by the user.

In the embodiment of FIG. 1B, the features and/or functions of computing device 100 may be combined with a user computing device 165 to provide the recommendation service. Thus, a network enabled television does not need to be present. Instead, the digital content and related notifications and/or recommendations may be presented to the user 164 via any presentation device 168, such as a television. Those skilled in the art will recognize that such a device may simply be an output device, e.g., display screen and/or speakers, of the user computing device 165 or of a television or other presentation device being utilized by the user 164. The user computing device 165 may be a laptop, smartphone, electronic book reader ("e-reader"), tablet computer or the like that is associated with a user 164 that is consuming digital content. Accordingly, in the embodiment illustrated in FIG. 1B, user computing device 165 implements the recommendation service that generates one or more recommendations for items of possible interest to the user 164 and provides one or more notifications to the user 164. In addition, the user computing device 165 may be in communication with one or more third party data sources 166 via a network 160 so that it may obtain data used to generate such notifications and/or recommendations.

In the illustrated embodiment, the user computing device 165 includes one or more elements of the computing device 100 discussed above. For example, the user computing device 165 may include the acquisition module 145, the analysis module 150 and presentation module 170, and may communicate with the presentation device 168 via a wired and/or wireless communication link. The other elements of the user computing device 165, such as the CPU 105, memory 130, etc., may be similar to the corresponding elements of computing device 100 in FIG. 1A. In other embodiments, the elements of the computing device 100 and the user computing device 165 may be different and/or distributed in other arrangements.

Figure 1C:
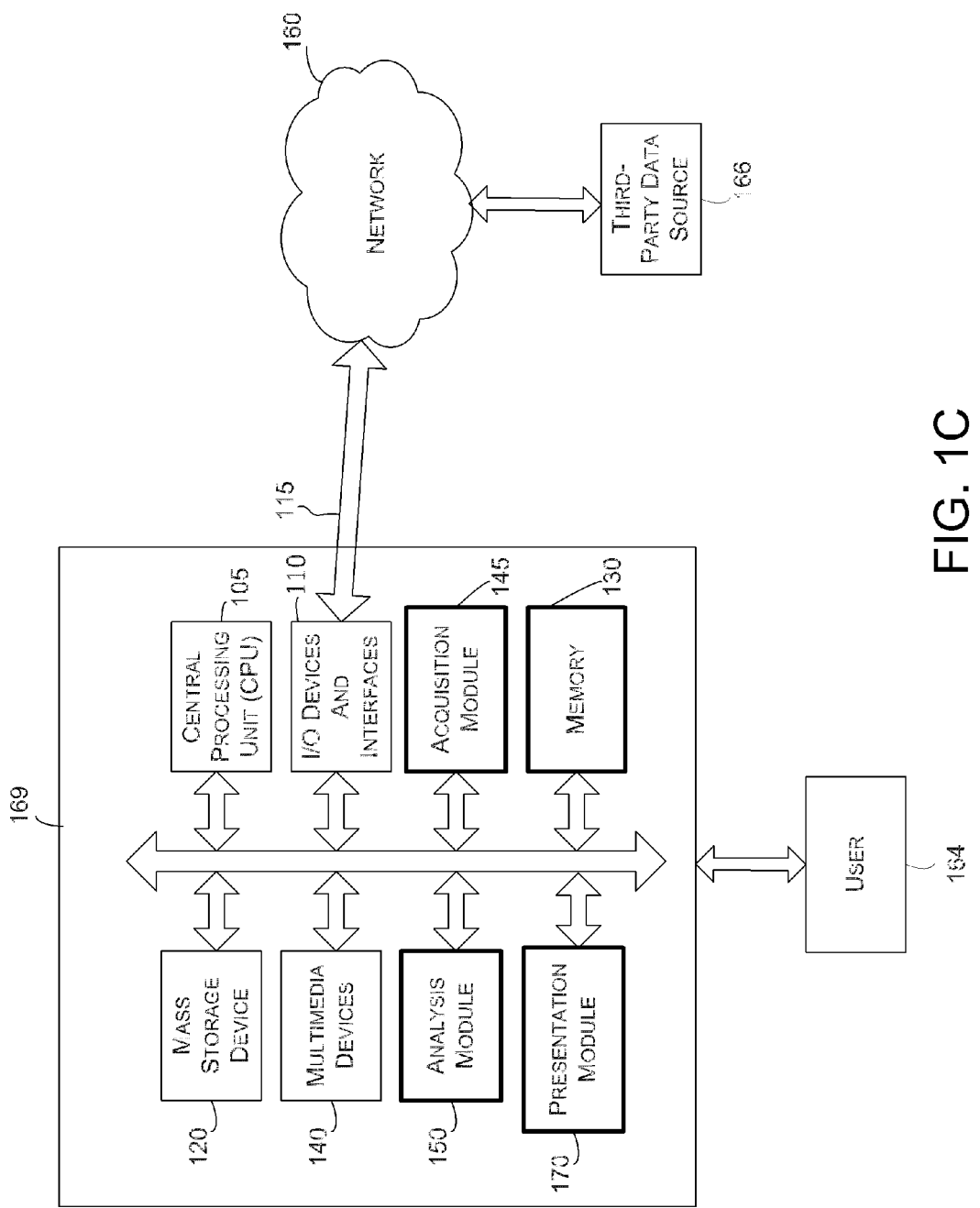
FIG. 1C depicts yet another illustrative embodiment of a networked environment in which a recommendation service that generates one or more recommendations for items of possible interest to a user, which recommendations are based at least in part on an association between the user and digital content being consumed by the user.

In the embodiment of FIG. 1C, the features and/or functions of computing device 100 may be provided by the network enabled television 169 itself. As shown in FIG. 1C, the user 164 is a person viewing digital content on the network enabled television 169. The network enabled television 169 provides the recommendation service that generates one or more recommendations for items of possible interest to the user 164 and provides one or more notifications to the user 164. Accordingly, in this embodiment, the network enabled television 169 includes the elements of the computing device 100 discussed above. For example, the network enabled television 169 includes the acquisition module 145, the analysis module 150 and presentation module 170, and is in communication with one or more third party data sources 166 via a network 160. The network enabled television 169 may comprise one or computing devices, software, firmware and hardware resources to enable the network enabled television 169 to connect to network 160 and to provide digital content to the user 164. The other elements of the network enabled television 169, such as the CPU 105, memory 130, etc., may be similar to the corresponding elements in FIG. 1A. In other embodiments the elements of the computing device 100 and the network enabled television 169 may be different and/or distributed in other arrangements.

In the embodiments discussed above, the recommendation service is provided by execution of an acquisition module 145, an analysis module 150 and a presentation module 170. Although illustrated in FIGS. 1A, 1B and 1C as embodied in a single computing device, in other embodiments, the modules may be distributed across multiple devices, and may be controlled and/or operated by multiple different entities. In addition, the operations performed by, and/or the instructions included in, the acquisition module 145, the analysis module 150 and the presentation module 170 may be combined and/or distributed across fewer, more or different modules.

The acquisition module 145 may be configured to acquire user profile information associated with the user 164, and to acquire characteristics information associated with the digital content being viewed by the user 164 from one or more third party data sources 166. The profile information may include information regarding the user's purchase history, rental history, item viewing history, item tagging activities, wish lists and/or other historical or behavioral aspects. However, in some embodiments, the profile information that is considered by the acquisition module is information other than information related to the user's digital content consumption habits (e.g., amount of content consumed, time of consumption, duration of consumption, frequency of consumption, subject matter of consumption, etc.), as such information may not necessarily generate recommendations for items of particular interest to the user for purchase. In one embodiment, the acquisition module 145 is configured to acquire the user profile information and the characteristics information in response to a request from the user 164. The analysis module 150 then analyzes the user profile information and characteristics information to determine any associations between the user 164 and the digital content, and/or any recommendations based at least in part thereon. The presentation module 170 may then provide any notifications regarding the determined associations and/or recommendations to the user 164.

As will be described below in connection with FIGS. 2A-2F, in some embodiments, when a user 164 desires a recommendation, the user 164 can transmit a request to the recommendation service (e.g., by clicking a button, launching an application, transmitting a command, speaking a command, etc. using an I/O device and interface 110). In certain embodiments, the user 164 may install or download an application, plug-in, applet, extension, etc. associated with the recommendation service to his/her computing device 165 or network enabled digital content consumption device (e.g., network enabled television 169) to enable transmission of the request and/or provide other processing provided by embodiments discussed herein. The user 164 may request a recommendation while consuming any type of digital content, such as a movie, a sporting broadcast, a television show, an audio book or the like. In some embodiments, the request also includes an aspect or characteristic that may be found in or related to the digital content. For instance, the user 164 may request a recommendation related to a particular character in a movie being watched by the user 164. Accordingly, in response to the user request, the recommendation service may generate a recommendation for a book about the character (e.g., an audio book, an e-book or a physical book) and send a notification of said recommendation to a user computing device associated with the user 164.

As another example, when the user 164 is watching a program or advertisement that advertises or displays an item previously purchased or used by the user 164, the user 164 may request a recommendation for other products or services related to the advertised/displayed item. In some embodiments, the user 164 requests the recommendation via a user profile/preferences form or a menu option displayed on a user computing device or a network enabled television, while the user 164 is viewing the program/advertisement, and the request is transmitted to and stored by the recommendation service. The recommendation service may then detect if the user 164 is watching an advertisement or program that advertises or displays an item previously purchased or used by the user 164 (explained below), and may generate and provide to a user computing device associated with the user 164 (which may be a separate device from the device via which the user 164 is viewing the advertisement/program) a notification for the recommendation.

Similarly, the user 164 may request a recommendation related to an item of interest included in the digital content and selected by the user 164 (e.g., by clicking on, pointing to or touching the item using an I/O device and interface 110). For example, the user 164 may select a hat worn by a character in a movie being viewed by moving a cursor over the hat and activating a selection control. The recommendation service may then determine an association between the user 164 and the selected item of interest and generate a recommendation based at least on the determined association. By way of example, the recommendation service may determine that the user 164 or the user's friend owns the same or similar hat, generate a recommendation for another hat, and provide a notification of the recommendation to the user 164.

As yet another example, the user 164 may have read an electronic book and highlighted text or an image related to an athlete included in the electronic book. Subsequently, the user 164 may request that a notification be provided to the user 164 when the user 164 is watching a sporting event that includes the athlete. Accordingly, when the user 164 is watching a sporting event, the recommendation service may determine that the athlete (for which the user highlighted passages in the electronic book) is being displayed to the user 164 (e.g., as a player on one of the teams participating in the sporting event) and provide a notification including the highlighted text or image related to the athlete from the electronic book via a user computing device (which may be a separate device from the device via which the user is viewing the sporting event). A variety of other notifications and/or recommendations may be created for users in various embodiments. Further examples will be given below.

In some embodiments, the user request may include additional data. For example, the request may include data such as an identification of user(s) consuming the digital content, time of the request, day of the request, location of the user(s) at the time of the request, identification information associated with digital content being consumed at the time of the request, preferences associated with any notifications and/or recommendations, etc. The data may be collected from the user(s) or by the recommendation service. For example, the recommendation service may determine the identity of user(s) consuming the digital content by performing image and/or voice recognition of the user(s) present using the I/O devices (e.g., a camera, microphone, etc.) and interfaces 110 as discussed above.

In response to the user request, the acquisition module 145 may, in some embodiments, acquire characteristic information associated with digital content being consumed by the user 164 from a third party data source 166 (explained further below). By way of illustration, the third party data source 166 may be an entity that provides digital content characteristics information to interested parties. The digital content characteristics information may include one or more of the following: a program title; a plot summary; names of characters; names of actors playing the characters; names of the director, producers, cinematographer, etc., writers; names of musical compositions/songs included in a sound track; names of composers of and artists performing the compositions; a script; a length; scene names; names of shooting locations; genre information; user ratings; industry ratings; program date; items and locations displayed in the program; etc.

In some embodiments, the acquisition module 145 may analyze digital content presented to user 164 to determine the characteristics information associated with the digital content. By way of illustration, the acquisition module 145 may analyze metadata associated with the digital content (e.g., metadata included with a broadcast or acquired from a third party source discussed above) to determine characteristics information associated with the digital content, including identification of objects, items, events, locations, people, dates, scenes, plots, actions, etc. Metadata can include in-depth descriptive information regarding, inter alia, title, storyline, cast, genre, release date, images or the like. The metadata associated with the digital content, in some embodiments, may be enhanced to include additional information as described above. For example, the metadata may be enhanced to include identification information associated with characters, people, objects, products, events, locations, dates, etc. The metadata associated with the digital content may be created by third party providers, users, recommendation services or the like.

In some embodiments, the acquisition module 145 of the recommendation service performs image recognition on the digital content to determine characteristics information. For example, the acquisition module 145 may analyze the digital content to detect images present in the digital content and then analyze the detected images to determine the characteristics information such as people, objects, locations, etc. by performing image recognition on the digital content. In other embodiments, acquisition module 145 converts the digital content to text and analyzes the converted text, e.g., to determine if a product, retail establishment or restaurant is mentioned. For example, the acquisition module 145 may detect audio included in the digital content and convert the audio to text using speech-to-text techniques. As another example, the acquisition module 145 may perform image recognition to detect any text displayed in the digital content (e.g., displayed on signs or billboards) and then analyze the detected text to determine characteristics information as discussed above.

In some embodiments, where the recommendation service may not have direct access to the digital content (e.g., FIG. 1B), the user 164 may provide the characteristics information to the recommendation service. In other embodiments, the user 164 may provide identification information for the digital content to the recommendation service and then the acquisition module 145 may obtain characteristics information for the identified digital content from other data sources, such as third party data sources 166. For example, the user 164 may indicate to the recommendation service that he/she is watching a particular baseball game, and the recommendation service may obtain from a third party data source 166 information regarding which players are playing in the game, which persons are broadcasting the game, in which stadium is the game being played, which commercials are to be displayed during the game, etc.

The acquisition module 145 may also acquire user profile information associated with the user 164 who submitted the user request from an internal data source and/or a third party data source 166 (explained further below) or other applications executed by computing device 100. In some embodiments, the acquisition module 145 is also configured to acquire recommendations information from a third party data source 166 (explained further below.)

Turning now to the analysis module 150 of the recommendation service, it may be configured to analyze the acquired user profile information and characteristic information related to identified digital content acquired by the acquisition module 145 to determine an association between the user 164 and the digital content. The analysis module 150 may then generate a recommendation and/or notification based at least in part on the determined association. For example, the analysis module 150 may analyze the time and location of the user request. Based at least in part on time and/or location information, the analysis module 150 may determine from one or more third party data sources 166 (e.g., a program guide that lists the names of programs being broadcast at specified times, locations and/or channels) that the user 164 is watching a particular movie. Then the analysis module 150 may generate a recommendation based at least in part upon an association between the digital content and the user 164. As a further example, if the user request indicates that the user 164 is interested in recommendations related to any places the user 164 has previously visited, analysis module 150 may analyze user profile information and characteristic information related to the digital content to determine an association between locations the user 164 has been and locations in the digital content. For example, if the user profile information indicates that the user 164 has visited a specific restaurant and the characteristic information related to the digital content indicates that the restaurant is being displayed or referred to in the digital content, the analysis module 150 may then generate a notification indicating that the user 164 has frequented the restaurant. The notification may then be presented on the user computing device. In addition, or alternatively, the notification may include a recommendation for a similar restaurant or a promotion related to the restaurant.

As another example, the user 164 may request a notification of information related to events about which the user 164 has read. Accordingly, the analysis module 150 may analyze other digital content the user 164 has purchased or consumed (as indicated by user profile information such as user purchase history) and identify any events associated with the same (e.g., wars, travels, elections, etc.). Accordingly, when the user 164 consumes another item of digital content, the analysis module 150 may analyze the metadata associated with the other item of digital content to determine whether any of the identified events are also included in the other item of digital content and generate any relevant notifications, and in some cases, recommendations based on the association between the identified events and the other item of digital content.

A variety of other associations may be determined by the analysis module 150 and a variety of notifications/recommendations may be generated for those associations in various embodiments. For example, the association may be a direct association (e.g., the user 164 has read about an event that is being shown in the digital content) and/or it may be an indirect association (e.g., an event in the digital content is similar to an event the user 164 has read about). In some embodiments, analysis module 150 may be configured to keep track of some or all previously generated notifications and/or recommendations. The analysis module 150 may review some or all previously generated notifications/recommendations to analyze user behavior associated with the previously generated notifications/recommendations, and use the analysis in determining what further notifications/recommendations should be generated for the user 164.

For example, if analysis module 150 determines a notification/recommendation is to be provided to the user based on an association, but determines that the same or similar notification/recommendation had previously been provided to the user 164, then analysis module 150 may be configured to prevent repeated provision of that notification/recommendation. By way of another example, if analysis module 150 determines that notifications/recommendations related to audio books had more positive user interactions than notifications/recommendations related to music (e.g., the user purchased many more recommend audio books than recommended songs), then analysis module 150 may generate notifications/recommendations only related to audio books or more heavily weighted to audio books.

Optionally, analysis module 150 may apply one or more association level models to the acquired user profile and/or digital content characteristic information to determine an association score that represents the level or degree of association between a user 164 and the item of digital content being consumed by the user 164. Based at least in part on the determined association score, analysis module 150 may determine whether or what type of a notification/recommendation may be generated. For example, the analysis module 150 may be configured so that only associations with association scores greater than a particular threshold may be used in the generation of notifications and/or recommendations.

Using an association level model, the analysis module 150 may rank or score an association of a given user 164 to an item of digital content based on various factors and/or based on comparison of the given user 164 to other users. Moreover, a variety of criteria could be used in the comparison or scoring, and different weights could be used in the comparison or scoring. For example, criteria relating to an amount of user profile information acquired for the user 164, type(s) of user profile information acquired, the reliability of the user profile information acquired, type(s) of digital content being consumed, date(s) user profile information is collected, source(s) from which the user profile information is collected, source(s) from which digital content information is collected, etc., may be used in the association level model to determine an association score. The association level model may then, by way of illustration, give a higher weight to user profile information related to purchase history than (or in addition to) user profile information related to demographic information. For example, if data relating to purchase history is collected from a credit bureau or financial institution, it can be given greater weight in the association level model than data collected from an Internet search (which may be deemed to be less reliable and/or comprehensive than the data from the credit bureau or financial institution). Accordingly, the resulting association score may be greater for those associations identified based on more reliable information.

The analysis module 150 may be configured to determine an overall association score, an association score in certain categories (e.g., television, movies or sports) or a combination of association scores as desired. The association levels model(s) can be recursively generated based on various factors, such as source(s) of user profile/digital content information, type(s) of user profile/digital content information analyzed, comparison to other users in a particular category or subcategory, comparison to other users with similar characteristics, weights given to specific information, user behavior in response to previous associations, effectiveness of associations, user preferences, system configurations, etc. The analysis module 150 may also apply weights to these association scores to determine an overall association score. The association level model(s) may also be modified or refined, as discussed above, based on the accuracy of the model in determining association scores. The association scores and/or overall association score may than be used to determine whether any notifications and/or recommendations should be generated.

Once an association is determined, the analysis module 150 may generate a recommendation based at least in part on the determined association. For example, the recommendation service may recommend books (e.g., audio books, e-books, physical books, etc.), music videos, video games, toys, electronics and/or other types of items to users. The recommendation service may also recommend other types of items or information, including but not, limited to authors, artists, points or places of interest, and/or groups or categories of goods or services. Briefly, given an identification of items that are "known" to be of interest to a user 164 (e.g., a list of items purchased, rated and/or viewed by the user) and based at least in part on the determined association(s), the analysis module 150 of the recommendation service may generate a list of additional items ("recommendations") that are predicted to be of interest to the user 164. (As used herein, the term "interest" refers generally to a user's liking of, attraction to, or affinity for an item; the term "known" is used to distinguish items for which the user has implicitly or explicitly indicated some level of interest from items predicted by the recommendation service to be of interest.)

Recommendations may optionally be generated using a table or other representation, which maps or correlates an item to related or "similar" items, without the need for users to rate any items (although ratings data may optionally be used). Such a table or other representation may be referred to herein as a "similarities table" or an "item-to-item mapping." For example, if there are three items that are known to be of interest to a particular user (such as three items the user recently purchased) and that have been determined to have an association to digital content being consumed by the user, the recommendation service may retrieve similar items for these three items from the similarities table, and appropriately use these similar items to generate one or more recommendations.

In accordance with one aspect, the similarities tables or item-to-item mappings can be generated periodically, such as once per week, from data which reflects the collective interests of a community of users and/or in response to user actions. For example, the item-to-item mappings may be generated by an off-line process which identifies correlations between items. By way of illustration, the mappings may be generated by analyzing user purchase histories to identify correlations between purchases of particular items (e.g., items A and B are similar because a relatively large portion of the users that purchased item A also bought item B). In addition or instead, the mappings may be generated using histories of the items viewed by individual users (e.g., items A and B are related because a significant portion of those who viewed item A also viewed item B). Item relatedness or similarity may also be determined based in-whole or in-part on other types of browsing activities of users (e.g., items A and B are related because a significant portion of those who put item A in their shopping carts also put item B in their shopping carts). Further, the item-to-item mappings may reflect other types of similarities, including content-based similarities extracted by analyzing item descriptions or content.

Once the analysis module 150 generates a recommendation and/or notification based at least in part on any determined associations, the presentation module 170 may transmit the generated notification and/or recommendation to the computing device via which the user 164 is consuming the item of digital content, to another device associated with the user 164 (e.g., the user's smart phone) or other third party system (discussed elsewhere herein). In some embodiments, the presentation module 170 may also provide the user 164 with a list or other identification of associations between the user 164 and the item of digital content that were determined by the analysis module 150. In response, the user 164 may select an identified association and/or select an action related to an identified association from the list. Accordingly, the analysis module 150 may then use the user's selection for generating a further or alternative recommendation.

The presentation module 170 may transmit the generated notification and/or recommendation based at least in part on user 164, the user's account settings and/or the user's preferences. For example, the user 164 may have previously specified that he or she wishes to receive notifications on the bottom-left of a display screen, via an audible message, etc. As another example, the user 164 may specify that any notifications and/or recommendations should be transmitted to a computing device 165 (e.g., smartphone, tablet or the like) associated with the user 164. As yet another example, the presentation module 170 may transmit the generated notifications and/or recommendations with an audible beep, a vibrating alert or the like. As another example, as in FIG. 1A, the presentation module 170 may transmit the notifications and/or recommendations via the network 160 to the network enabled television 169 such that the network enabled television 169 may presents the notifications and or recommendations to the user 164.

Optionally, the user 164 may customize/specify where, when and/or how notifications and/or recommendations are sent. For example, the user 164 may specify the type of information to be included in notifications, the devices to which notifications are sent, the time of day in which notifications are sent, the duration associated with any notifications and any other aspect of notifications. Such customizations may be performed with respect to all notifications, specified groups of notifications and/or individual notifications. Thus, the user 164 may customize a certain notification for delivery via SMS, MMS, or microblog post, etc., while another group of notifications are set up to be delivered via email.

As yet another example, the user 164 may specify that a notification and/or recommendation only be transmitted to the user 164 when the item subject of the recommendation is on sale or subject to some other type of promotion. In certain embodiments, the presentation module 170 may have access to information regarding the availability or future availability of books, events, movies, electronics, music, etc. and the user 164 may specify that the notifications and/or recommendation only be transmitted when the item subject of the recommendation is available or will be available. In certain configurations, the presentation module 170 may provide an indication in the notification and/or recommendation that similar items may become available in the future and/or of the expected availability or release date for those similar items. As an example, presentation module 170 may provide a notification recommending a book and also include an indication that a movie based on the book may become available in three months. In another example, the user 164 may indicate that a notification and/or recommendation only be transmitted if the digital content being consumed is a sporting event that is being broadcast. It will be appreciated by those skilled in the art that the presentation module 170 may be configured to review the preferences and/or customizations before transmitting any notifications and/or recommendations and that a variety of other configurations are possible in other embodiments.

FIGS. 2A-2F depict illustrative graphical user interfaces (GUIs) generated by the presentation module 170 of the recommendation service for presentation to the user 164 as the user 164 consumes digital content. The following examples are intended to illustrate user interaction with a particular illustrative user interface and are not intended to limit the scope of the interaction or functionality of the presentation module 170 or recommendation service. For example, in certain interactions described below, a display page, popup window, dialog box, drop-down menu, user-selectable icon or button, etc. may be illustrated. These illustrated GUIs are intended to depict ways that a user 164 can interact with the recommendation service to select desired functionality or by which the recommendation service can receive data inputs from the user 164, but these illustrative examples are not intended to be limiting, and the GUIs can be designed or configured differently in other implementations. In addition, in other use cases, not all of the interactions between the user 164 and the GUIs described below need be performed. The interactions may be performed in a different order or sequence, additional or different interactions may be included or the interactions may be combined in one or a subset of interactions without departing from the scope of the present disclosure.

GUIs such as those illustrated in FIGS. 2A-2F may be presented on a computing device upon which the user 164 is consuming the digital content (e.g., the network enabled television 169) or a computing device 165 associated with the user 164 but not being used to consume the digital content (e.g., the user's smart phone). A GUI can be accessed by or displayed on such a computing device so that the user 164 can view notifications and/or recommendations, dismiss notifications and/or recommendations, and/or perform any actions associated with the notifications and/or recommendations. However, as those skilled in the art will appreciate, a user 164 in other implementations may access the functionality of the recommendation service via an Application Programming Interface (API) or other types of interfaces.

Figure 2A:
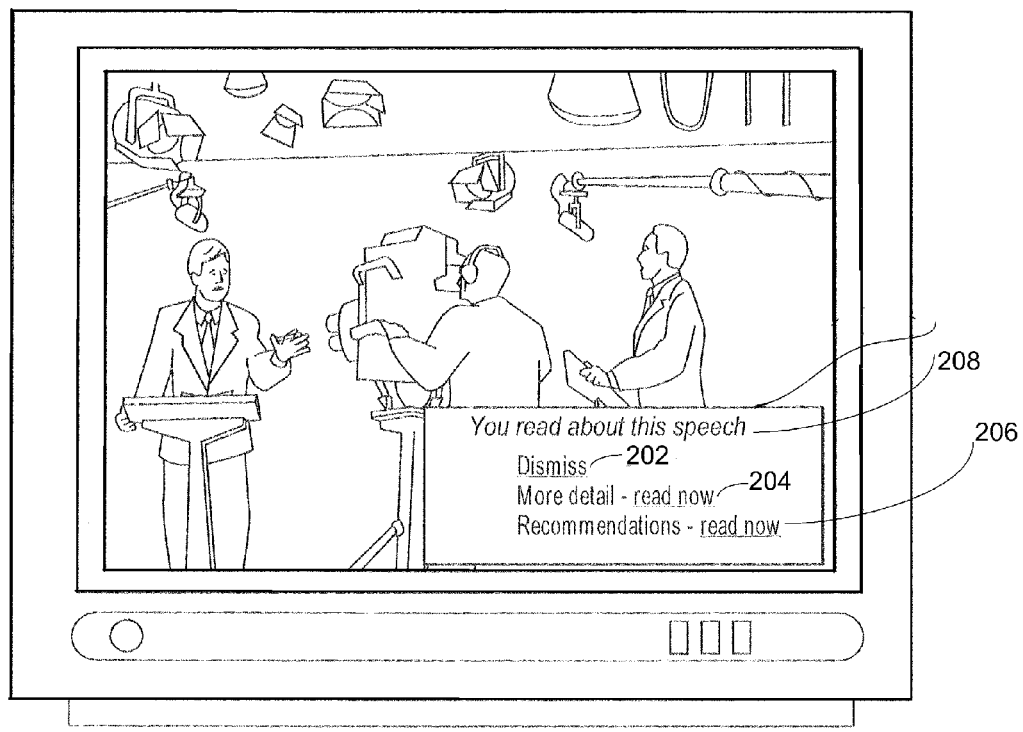
FIGS. 2A-2F depict illustrative graphical user interfaces (GUIs) generated by the recommendation service for presentation to a user as the user consumes digital content.

As shown in FIG. 2A, presentation module 170 may be configured to provide a GUI 200 including a notification 208 to user 164 via a network enabled television 169. As illustrated, the GUI 200 may be provided to the user 164 while the user 164 is watching digital content, such as a video or television program via the network enabled television. In the illustrated example, the user 164 is notified that a speech occurring in the digital content was previously read about by the user 164. As discussed above, the recommendation service can identify from the user's profile information that the user 164 has previously consumed items of digital content regarding this speech and thus, determine that the user 164 is associated with the speech occurring in the digital content currently being viewed by the user 164. The user 164 can respond to the notification by "dismissing" the notification 208 (e.g., by selecting a "Dismiss" control 202 with a remote control or other user I/O device and interface 110 for the network enabled television 169), or by requesting "More detail" regarding the notification (e.g., by selecting a "read now" control 204). The user 164, in some embodiments, may also view one or more recommendations that were generated by the recommendation service based at least in part on the association determined between the user 164 and speech occurring in the digital content being viewed. In this regard, the user 164 may select the "read now" control 206 with a remote control or other input device. Those skilled in the art will recognize that the notification may optionally be presented on display of the network enabled television 169 in different locations as desired, and/or can be provided to other devices or by other techniques as discussed elsewhere herein, as specified by the user's preferences.

As discussed elsewhere herein, a variety of other types of notifications and/or recommendations may also be generated by the recommendation service and presented in a GUI generated by the presentation module 170. For example, the analysis module 150 may determine that a scene in a television program or movie may be taking place in a neighborhood associated with the user 164. Analysis module 150 may then generate a notification and/or recommendation based on the determined association. The notification may include information regarding the buildings or businesses in the scene (e.g., business names, type of business, user ratings of the business, etc.), previously recorded images of the location of the scene, etc. In some embodiments, the images may be retrieved from a third party data source 166, such as a social networking website, and may include information identifying items of interest in the image, such as tags identifying the location and/or the people (e.g., the user and the user's friends) in the image. The tags may have been added by the user, the user's friends or other persons or systems. The analysis module 150 may analyze these tags to determine that the user 164 is associated with the television program or movie being consumed because the user 164 has been to the location of the particular scene been viewed. Accordingly, some or all of the tag information or images may be presented to the user 164 while the user is watching the television program or movie.

As another example, the analysis module 150 of the recommendation service may determine that a restaurant appearing in the digital content the user 164 is consuming, is a restaurant to which the user 164 has been, based at least in part on data obtained from a social networking website (e.g., from the user's or a friend's social networking page that includes the restaurant's name and an indication/statement that the user has been to the restaurant). The analysis module 150 may then generate a notification based on this association. The presentation module 170 may then generate a GUI to be presented to the user 164 that notifies the user of the association and includes an image of the restaurant. In addition, the image may be presented with information identifying persons, friends, objects, places, etc. that the analysis module 150 may have detected while determining the association. As yet another example, the analysis module 150 may determine that the user 164 is watching a sporting event and determine that the user 164 has previously visited the stadium where the sporting event has occurred. The presentation module 170 may then generate a GUI including a notification of this association, which notification includes the location where the user 164 was seated, the dates the user 164 visited the stadium, the event that the user 164 watched at the stadium, an image of the view from the user's seat, etc.

As a further example, the analysis module 150 of the recommendation service may determine that an excerpt from an audio book to which the user 164 has listened is related to a television program the user 164 is watching. The analysis module 150 may then generate a notification that provides this association, for example, by including the relevant excerpt from the audio book for playback if desired. By way of illustration, if the user 164 is watching a baseball game and three men are on base with two outs, and analysis module 150 has determined that the user 164 has listened to an audio book related to baseball, such as the book *Moneyball* by Michael Lewis, then relevant excerpts from the audio book (e.g., excerpts related to similar situations) may be included with the notification and presented to the user 164 via a GUI generated by the presentation module 170.

Figure 2B:
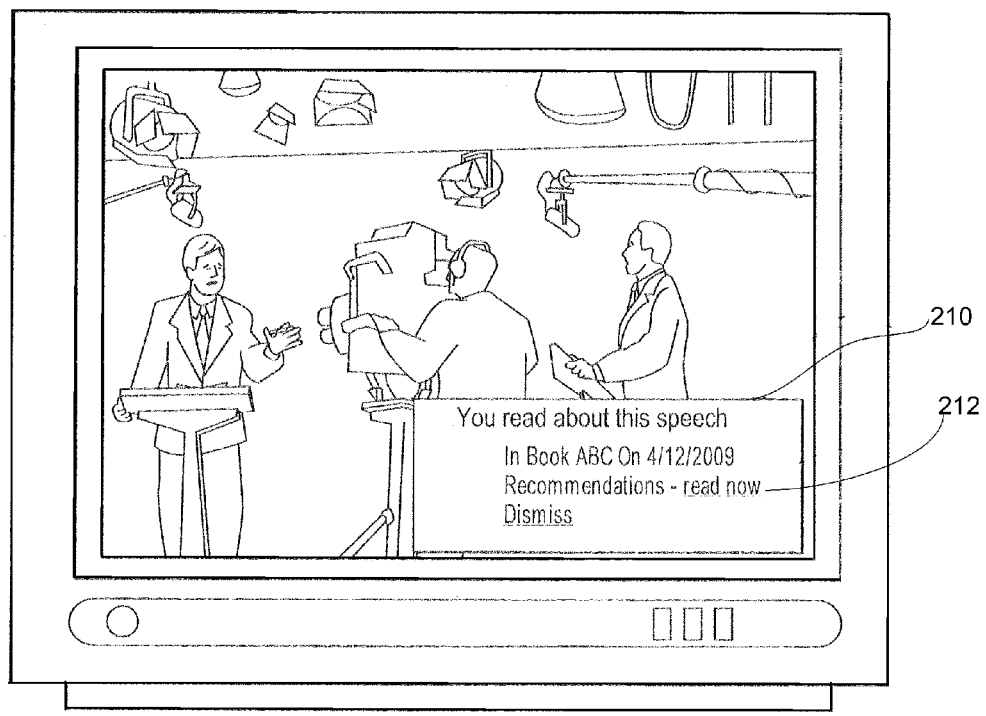

Returning now to the figures, as shown in FIG. 2B, more details related to a notification may be provided if the user 164 selects the "read now" control 204 in FIG. 2A. For example, the presentation module 170 may generate a GUI 210 that includes more information regarding the association that was determined between the user 164 and the digital content being consumed. In the illustrated example, the GUI 210 presented on the display of the network enabled television 169 includes information that the user 164 read about the speech occurring in the video/television program in an electronic book entitled *Book ABC* that was last accessed on Apr. 12, 2009. Those skilled in the art will appreciate that the GUIs generated by the presentation module 170 may include a variety of other information regarding the determined association as discussed above. For example, GUIs may include passages from *Book ABC* that were highlighted by the user 164, annotations to Book ABC that were made the user 164, etc. In addition, user 164 may also view one or more recommendations for related books, articles, magazines, etc. if the user 164 selects a "read now" control 212 from the GUI 210.

Figure 2C:
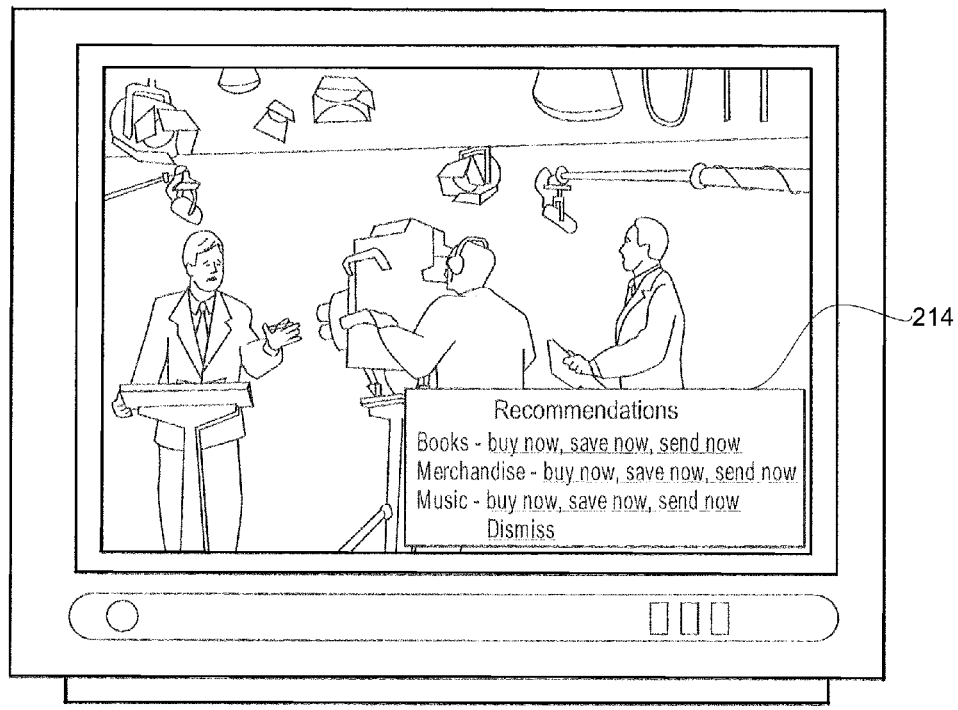

As shown in FIG. 2C, one or more recommendations related to the association determined between the user 164 and the video/television program being consumed, may be presented if the user 164 selects the "read now" control 206 from the GUI 200 depicted in FIG. 2A or the "read now" control 212 from the GUI 210 depicted in FIG. 2B. As discussed above, analysis module 150 of the recommendation service may determine one or more recommendations based at least in part on the determined association between the user 164 and the digital content the user 164 is consuming. In the illustrated GUI 214, the recommendations are for books, merchandise and music related to the determined association. However, those skilled in the art will recognize that any type, number or categories of recommendations could be presented without departing from the scope of the present invention. Those skilled in the art will also recognize that the user 164 can select the recommendations of interest from the GUI 214 using a user input device and be presented further GUIs that enable the user 164 to perform one or more actions related to the recommendations (e.g., "buy," "save," "send," etc.). For example, the user 164 may request that the recommendations be sent to his or her email address so that the user 164 can resume consumption of the digital content and consider the recommendations at a later, more convenient, time. In this regard, in some embodiments, a GUI may be configured to enable the user 164 to stop playback of the digital content while the user 164 is interacting with any notifications. As an example, if the GUI including the notification includes excerpts from an audio book, the user 164 may select to stop playback of the item digital content being consumed and choose to listen to the excerpts from the audio book and/or read any text associated with the excerpts.

Figure 2D:
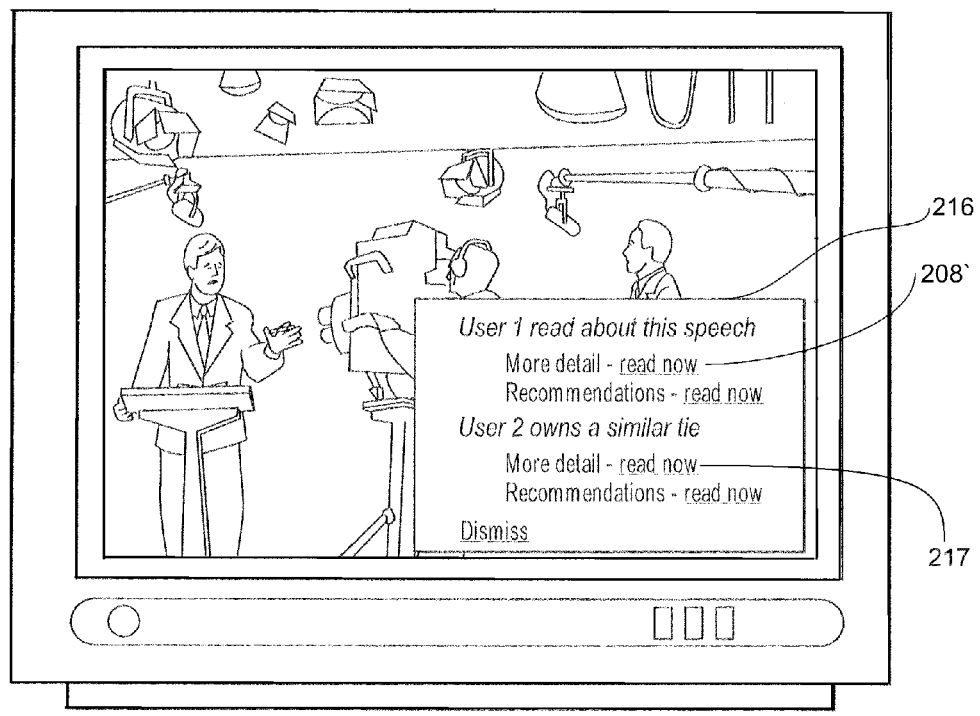

As shown in FIG. 2D, multiple users may be consuming the item of digital content (e.g., multiple users may be watching the network enabled television 169) and thus, the presentation module 170 may generate GUIs that include notifications for multiple users. For example, analysis module 150 of the recommendation service may determine an association between each consuming user and the item of the digital content being watched. Accordingly, the presentation module 170 may generate a GUI such as GUI 216 depicted in FIG. 2D to present notifications and/or recommendations to some or all of the consuming users. In some embodiments, the notifications and/or recommendations for each consuming user may be presented in different colors, sizes, locations, means, etc. based on each consuming user's preferences. In the illustrated example, User 1 is provided the same notification as in FIG. 2A, and User 2 is provided a notification of the determined association that he owns a similar tie to the tie being worn by a character appearing in the video/television program being viewed by User 1 and User 2. Each user may interact with the GUI 216, as discussed above in connection with FIGS. 2A-2C.

In some embodiments, the type or number of notifications that may be included in a GUI may be based at least in part on the user(s) identified as consuming the digital content. For example, if analysis module 150 of the recommendations service determines (e.g., based at least in part on user profile information) that the identified user(s) are all from the same college and are watching a college football game, analysis module 150 may generate notifications and/or recommendations that are common to all or a subset of identified user(s) and/or the college generally. As another example, if analysis module 150 determines that the identified user(s) comprise a family and some of the identified user(s) are below the age of 18, then the analysis module 150 may generate only notifications that are common to the family and/or are appropriate based on the age of the identified user(s).

Figure 2E:
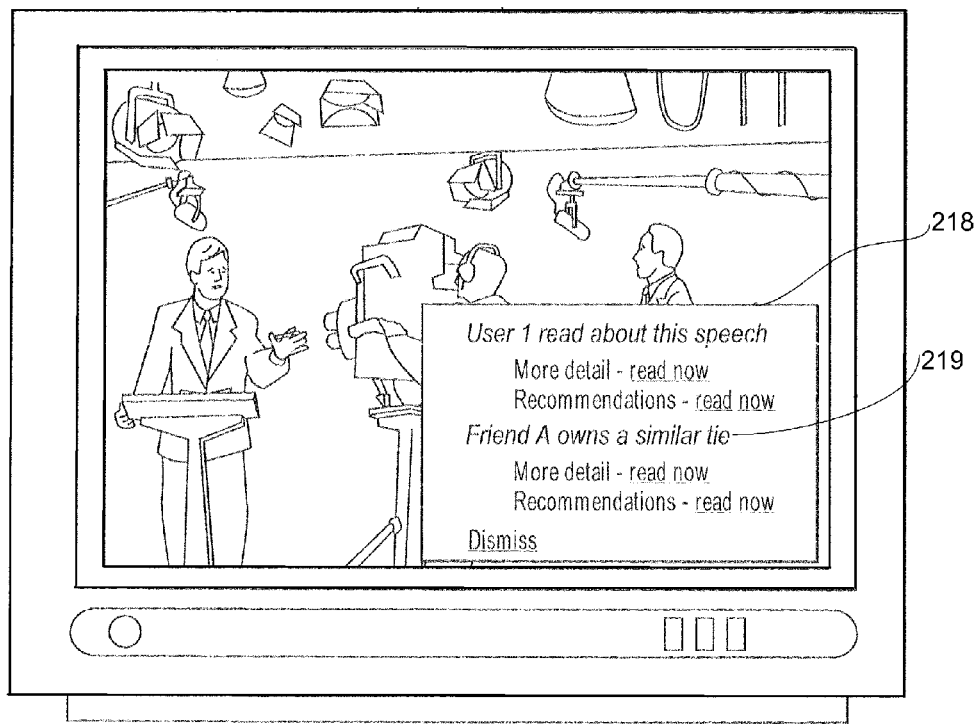

As shown in FIG. 2E, the GUI 218 may include additional information determined from analyzing data from one or more third party data sources 166 (such as a social networking website) and then determining one or more associations between the user 164 and the digital content being consumed. For example, the analysis module 150 may determine an association between the digital content being consumed and a contact identified in the social graph of the user 164 as maintained by the social networking website. Accordingly, in FIG. 2E, User 1 is provided an additional notification 219 regarding the contact, e.g., that "Friend A owns a similar tie." In some embodiments, the analysis module 150 may not use contact information from a user's social graph, but may instead determine an association based on persons generally, persons in a certain demographic group, persons in a particular geographic region or the like, as desired.

Figure 2F:
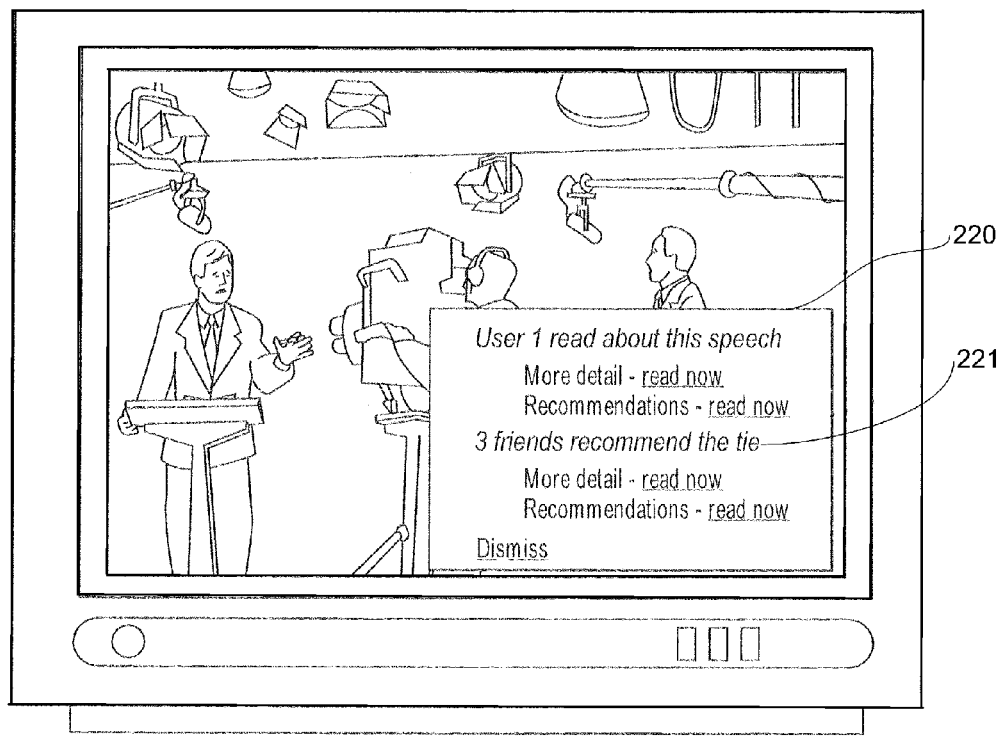

FIG. 2F illustrates another example GUI 220 in which enhanced information is presented to the user 164 based on an association determined between the user's social graph as obtained from a social networking website and the video/television program being consumed. In the illustrated example, GUI 220 includes a notification 221 that three of the user's friends have recommend the tie worn by a character in the digital content being consumed. The user 164 may then view more detail regarding the friends and the associations and/or any recommendations as discussed above.

Figure 3:
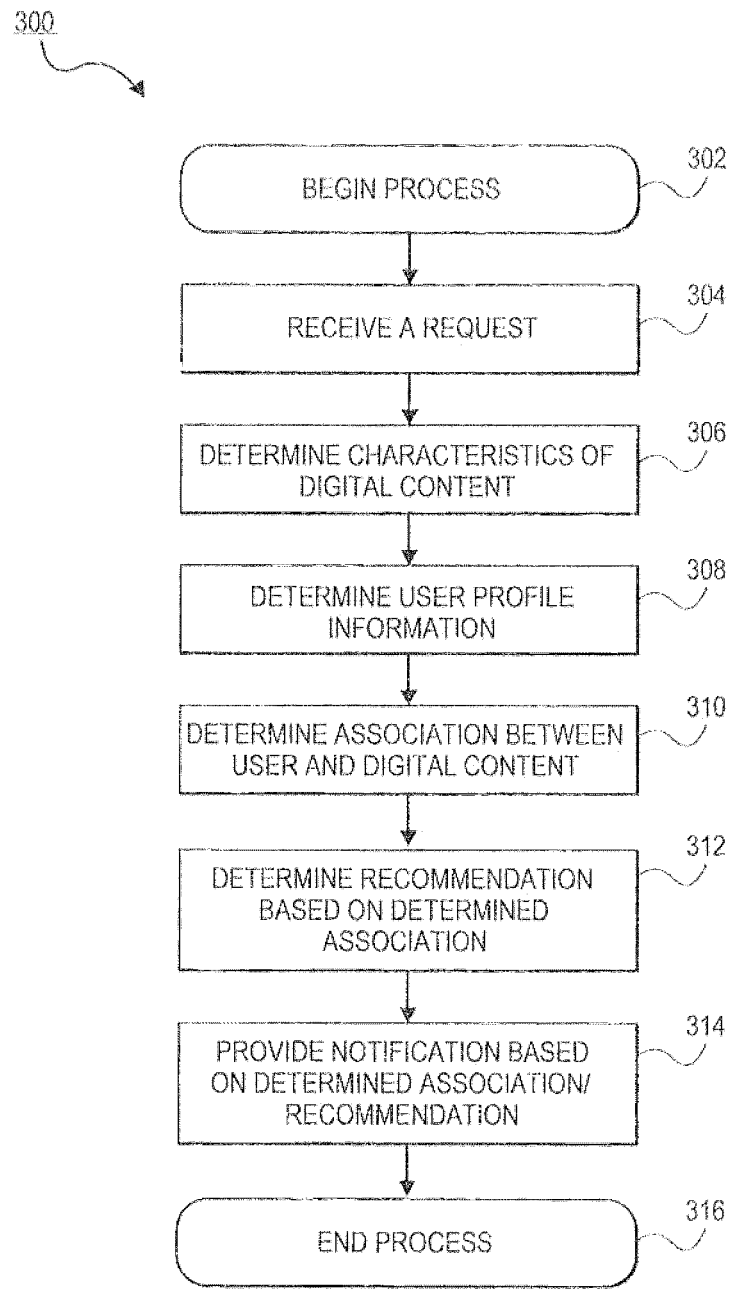
FIG. 3 is a flow diagram of an illustrative process for generating one or more recommendations for items of possible interest to a user, which recommendations are based at least in part on an association between the user and digital content being consumed by the user.

FIG. 3 is a flow diagram of an illustrative process 300 for generating one or more recommendations for items of possible interest to a user 164, which recommendations are based at least in part on an association between the user 164 and the digital content being consumed by the user 164. The method 300 may include fewer or additional blocks and/or the blocks may be performed in a different order than is illustrated. Software code configured for execution on a computing device in order to perform the method of FIG. 3 may be provided on a non-transitory computer readable medium, such as a compact disc, digital video disc, flash drive, hard drive, memory device or any other tangible medium. Such software code may be stored, partially or fully, on a memory device of the computer, such as the computing device 100, in order to perform the method 300. For ease of explanation, the method 300 will be described herein as performed by the computing device 100; however, the method may be performed by any other suitable computing device as described above.

The method 300 begins at block 302. In block 304, the recommendation service receives a request. As explained above, the request can be initiated by a user 164 and may include request information, such as time, day, location of the user 164 at the time of the request, identification information associated with the item of digital content being consumed at the time of the request, identification of the user(s) consuming the digital content at the time of the request, etc.

Next, in block 306, the recommendation service determines one or more characteristics of the digital content being consumed by the user 164. For example, if the request includes location data or GPS data, the recommendation service may use this data to determine location information for the user 164 and identify a characteristic(s) of the digital content from one or more third party data sources 166 based at least in part on the location information. In addition or alternatively, if the digital content includes metadata, the recommendation service may determine characteristics of the digital content by analyzing the metadata, as discussed above.

Next, in block 308, the recommendation service determines or identifies profile information for the user 164 (and any other identified users). The recommendation service may communicate with one or more third party data sources 166 to acquire user profile information. For example, the recommendation service may communicate with a third party data source 166 (e.g., data stores of network retail websites, social networking websites, etc.) to obtain a purchase history and/or other behavior or historical data associated with the user 164. Those skilled in the art will appreciate that the recommendation service may communicate with a variety of other third party sources 166 to acquire user profile information, such as, search engines, websites, local information offices, news outlets, data repositories or the like. In addition, the recommendation service may acquire information associated with one or more items of interest, as discussed above. By way of illustration, the recommendation service may access one or more third party data sources 166 to obtain information, such as business information, availability information, reservations information, pricing information, sales information, etc. for the items of interest.

Next, in block 310, the recommendation service determines an association between the user 164 and the digital content the user is consuming. The recommendation service analyzes the user's profile information and the characteristic(s) of digital content being consumed by the user 164 to determine any associations as discussed above.

Moving to block 312, the recommendation service determines one or more recommendations based at least in part on any determined associations. Next, in block 314, the recommendation service generates one or more notifications including any information regarding the determined associations and/or any recommendations based on the determinations, and provides them to the computing device (e.g., computing device 165 or network enabled television 169) upon which the user 164 is consuming the digital content or to another computing device associated with the user as noted above. The method 300 ends at block 316.

In some implementations, a user 164 can request generation of notifications for a type of digital content other than a video or television program. For example, a user 164 can request the generation of notifications for a radio broadcast and/or an audio book the user 164 is watching or hearing. The recommendation service may process the request as discussed above and provide any notifications to the user 164 as discussed above. For example, the recommendation service may analyze the audio of the radio program and/or audio book to determine a characteristic(s) of the radio program and/or audio book, and then analyze user profile information and characteristic information to determine any associations. Then the recommendation service may then generate or provide any notifications or recommendations based on any determined associations.

By way of illustration, if the user 164 is listening to an interview with a famous actor, the recommendation service may determine that the user 164 has read a biography associated with the actor and may provide a notification based on the association. As another example, a user 164 can request the generation of any notifications/recommendations while the user 164 is browsing the Internet. The recommendation service could process the request as discussed above and provide any notifications to the user 164 as discussed above. For example, the recommendation service may analyze data from one or more websites the user 164 is browsing to determine a characteristic(s) of the websites, and then analyze user profile information to determine any associations. Then the recommendation service may generate or provide any notifications or recommendations based on any determined associations. By way of illustration, if the user 164 is browsing a news website, the recommendation service may determine that the user 164 has visited a country being discussed on the news website and may provide a notification based on the association. As another example, a user 164 can request the generation of any notifications and/or recommendations while the user 164 is reading an electronic book on an electronic book reader, etc. The recommendation service could process the request as discussed above and provide any notifications to the user 164 as discussed above. For example, the recommendation service may analyze content from an electronic book the user 164 is reading, viewing, highlighting, etc. to determine characteristics of the electronic book, and then analyze user profile information to determine any associations. Then the recommendation service may generate or provide any notifications or recommendations based on any determined associations. By way of illustration, if the user 164 is reading a fiction novel, the recommendation service may determine that the user 164 owns an action figure from the novel and may provide a notification based on the association.

Depending on the embodiment, certain acts, events or functions of any of the processes or algorithms described herein can be performed in a different sequence, can be added, merged or left out altogether (e.g., not all described operations or events are necessary for the practice of the processes or algorithms). Moreover, in certain embodiments, operations or events can be performed concurrently, e.g., through multi-threaded processing, interrupt processing or multiple processors or processor cores or on other parallel architectures, rather than sequentially.

The various illustrative logical blocks, modules, routines and algorithm steps described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine or algorithm described in connection with the embodiments disclosed herein can be embodied directly in hardware, in a software module executed by a processor or in a combination of the two. A software module can reside in RAM memory, flash memory, ROM memory, EPROM memory, EEPROM memory, registers, hard disk, a removable disk, a CD-ROM or any other form of a non-transitory computer-readable storage medium. An exemplary storage medium can be coupled to the processor such that the processor can read information from and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Conjunctive language such as the phrase "at least one of X, Y and Z," unless specifically stated otherwise, is to be understood with the context as used in general to convey that an item, term, etc. may be either X, Y or Z or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of the present disclosure is indicated by the appended claims rather than by the foregoing description. All changes which come within the meaning and range of equivalency of the claims are to be embraced within their scope.

What is claimed is:

1. A system comprising:
    an electronic data store configured to store profile information for a user; and
    a computing device in communication with the electronic data store, the computing device configured to:
        during presentation of a video program to the user,
            identify a product depicted in the video program that is being presented to the user;
            determine, in substantially real-time, an association between the video program and the user based at least in part on the product depicted in the video program and the profile information for the user, wherein the profile information identifies at least one of a person, place, and item that is related to the depicted product;
            determine an association score corresponding to a level or degree of the association between the video program and the user;
            generate a recommendation for a recommended product based at least in part on the association that is determined and the association score;
            generate a notification to the user of the recommendation; and
            cause the notification to be displayed on an interface that allows the user to initiate, via the Internet, a purchase of the recommended product.

2. The system of claim 1, the computing device being further configured to provide the generated notification to the user during presentation of the video program.

3. The system of claim 2, wherein the notification is provided to the user via at least one of a display upon which the video program is being presented to the user and an electronic message.

4. The system of claim 1, wherein the product depicted in the video program is determined based at least in part on at least one of metadata associated with the video program, audio data associated with the video program, image recognition of items referenced in the video program, audio recognition of items referenced in the video program, and data regarding the video program that is received from one or more third party data sources.

5. A computer-implemented method comprising:
as implemented by one or more computing devices configured with specific computer-executable instructions,
identifying a product depicted in digital content being consumed by a user;
receiving profile information for the user, the profile information identifying at least one of a person, place, and item that is related to the depicted product;
determining an association between the user and the digital content being consumed by the user based at least in part on the depicted product and the received user profile information;
determining an association score corresponding to a level or degree of the association between the user and the digital content being consumed by the user;
generating a recommendation for an item of interest to the user based at least in part on the association and the association score;
generating a notification relating to the association; and
providing the notification to the user while the user is consuming the digital content.

6. The computer-implemented method of claim 5, wherein the notification includes information regarding the generated recommendation for the item of interest.

7. The computer-implemented method of claim 5, wherein the notification includes information regarding the determined association.

8. The computer-implemented method of claim 5, wherein providing the notification to the user comprises outputting the notification on a computing device upon which the user is consuming the digital content.

9. The computer-implemented method of claim 5, wherein providing the notification to the user comprises outputting the notification on a computing device associated with the user other than the computing device upon which the user is consuming the digital content.

10. The computer-implemented method of claim 5, wherein providing the notification to the user comprises sending the user an electronic message.

11. The computer-implemented method of claim 5, wherein identifying a product depicted in the digital content comprises analyzing metadata associated with the digital content.

12. The computer-implemented method of claim 5 further comprising receiving a request from the user for a notification relating to an association between the user and the digital content being consumed by the user.

13. The computer-implemented method of claim 5, wherein the user profile information comprises at least one of: purchase history information for the user, demographic information for the user, location information for the user, behavior information for the user, historical information for the user, preference information for the user, and personal information for the user.

14. A non-transitory computer-readable medium storing computer-executable instructions that, when executed by one or more processors, cause operations comprising:
identifying a product depicted in digital content that is being presented to a user;
obtaining profile information for the user, the profile information identifying at least one of a person, place, and item that is related to the depicted product;
as the digital content is being presented to the user, determining an association between the user and the digital content being presented based at least in part on the product depicted in the digital content being presented to the user and the profile information for the user;
determining an association score corresponding to a level or degree of the association between the user and the digital content being presented to the user;
generating a recommendation for an item of interest to the user based at least in part on the association and the association score; and
providing a notification to the user regarding the association.

15. The non-transitory computer-readable medium of claim 14, wherein the digital content comprises at least one of audio content, video content, and multimedia content.

16. The non-transitory computer-readable medium of claim 14, wherein the notification is provided to the user while the digital content is being presented to the user.

17. The non-transitory computer-readable medium of claim 14, wherein the notification provided to the user includes information related to the recommendation.

18. The non-transitory computer-readable medium of claim 14, wherein the user profile information comprises at least one of: purchase history information for the user, demographic information for the user, location information for the user, behavior information for the user, historical information for the user, preference information for the user, and personal information for the user.

19. The computer-implemented method of claim 5, wherein identifying a product depicted in digital content being consumed by a user comprises:
receiving audio data of the digital content;
converting the audio data to text; and
identifying the product from the text.

20. The computer-implemented method of claim 5, wherein identifying a product depicted in digital content being consumed by a user comprises:
identifying text displayed in the digital content; and
identifying the product from the text displayed in the digital content.

21. The computer-implemented method of claim 5, further comprising that the notification has not been previously provided to the user.

22. The computer-implemented method of claim 5, further comprising determining that the association score is greater than a threshold score.

23. The computer-implemented method of claim 5, wherein determining the association score is based at least in part on at least one of an amount of profile information, a type of the profile information, a reliability of the profile information, a type of the digital content, a date in which the profile information is collected, or a source from which the profile information is collected.

24. The computer-implemented method of claim 5, wherein determining an association score corresponding to a level or degree of the association between the user and the digital content being consumed by the user comprises applying an association level model to the profile information.

25. The computer-implemented method of claim 24, wherein the association level model is a model of associations between a plurality of users and the digital content.

26. A system comprising:
   an electronic data store configured to store profile information for a user; and
   a computing device in communication with the electronic data store, the computing device configured to:
      during presentation of digital content to the user,
         identify a product depicted in the digital content that is being presented to the user;
         determine an association between the digital content and the user based at least in part on the product depicted in the digital content that is being presented to the user and the profile information for the user, wherein the profile information identifies at least one of a person, place, and item that is related to the depicted product;
         determine an association score corresponding to a level or degree of the association between the user and the digital content that is being presented to the user; and
         generate a recommendation for an item of interest to the user based at least in part on the association and the association score.

27. The system of claim 26, wherein the profile information for the user comprises information other than information related to the user's digital content consumption habits.

28. The system of claim 26, wherein the computing device is at least one of: a user computing device, a remote computing device and a network enabled content consumption device.

29. The system of claim 26, the computing device being further configured to:
   generate a notification to the user regarding the recommendation; and
   provide the notification to the user during presentation of the digital content.

30. The system of claim 29, wherein the notification is provided to the user via at least one of an output device upon which the digital content is being presented to the user and an electronic message.

\* \* \* \* \*